No. 631,157. Patented Aug. 15, 1899.
S. R. DUVALL.
TIRE SETTER AND PLACER.
(Application filed May 22, 1899.)
(No Model.)
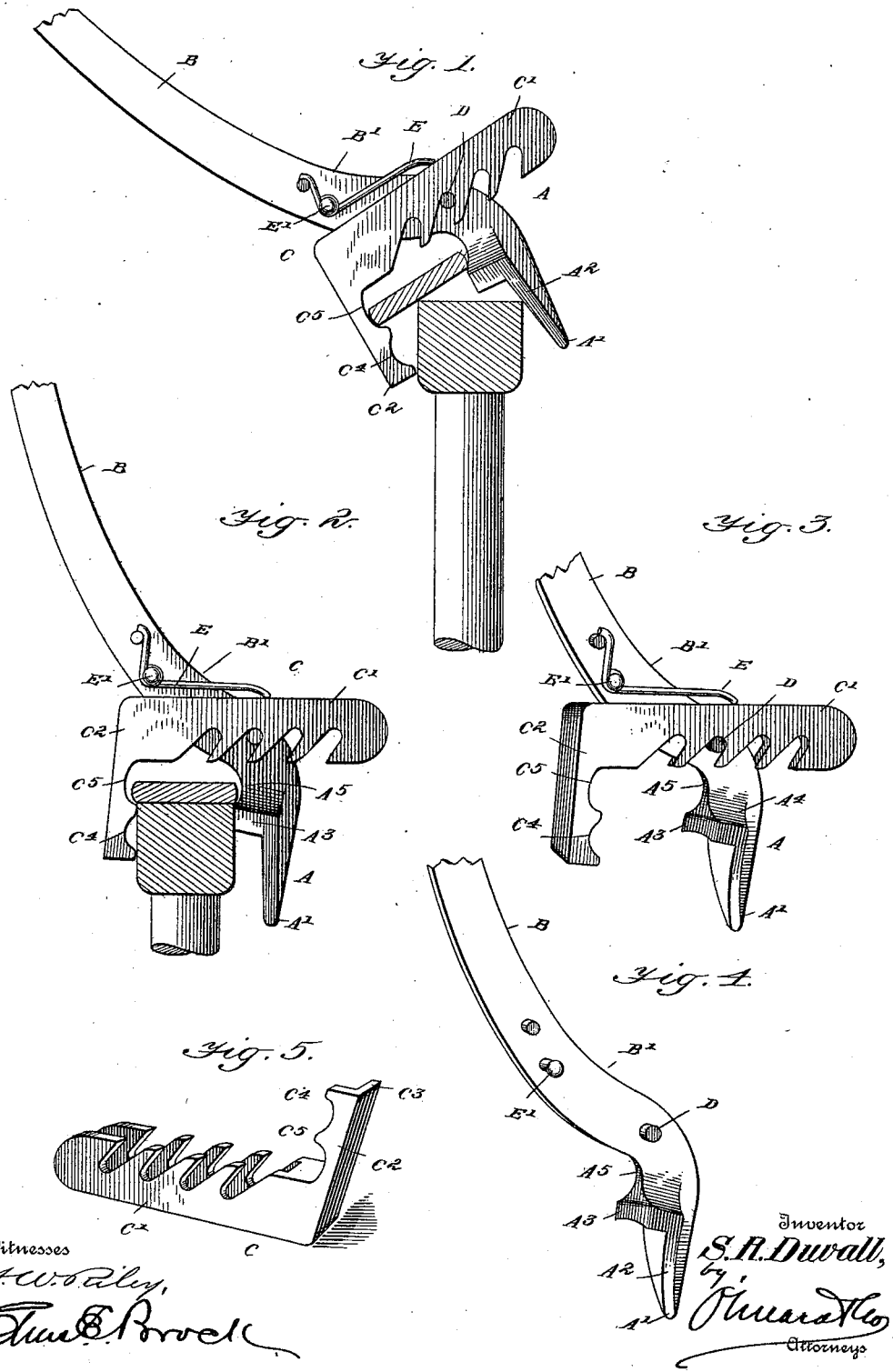

UNITED STATES PATENT OFFICE.

SAMUEL R. DUVALL, OF ELLICOTT CITY, MARYLAND.

TIRE SETTER AND PLACER.

SPECIFICATION forming part of Letters Patent No. 631,157, dated August 15, 1899.

Application filed May 22, 1899. Serial No. 717,772. (No model.)

*To all whom it may concern:*

Be it known that I, SAMUEL R. DUVALL, a citizen of the United States, residing at Ellicott City, in the county of Howard and State of Maryland, have invented a new and useful Tire Setter and Placer, of which the following is a specification.

This invention is a new and improved tire placer and setter, the object of the invention being to provide a tool of this kind which can be manipulated with one hand to lift the hot tire upon the rim of the wheel and set or place the same in its proper or exact position, leaving the other hand of the operator free to be used as necessary.

Another object of the invention is to provide a tool of the kind described which shall be adjustable, thereby enabling the said tool to be used upon wheel-rims of different widths and thicknesses.

With these various objects in view the invention consists, essentially, of a rigid jaw integral with the shank or handle and having a transverse shoulder or flange adjacent to its end and an adjustable jaw pivoted to the fixed jaw, said pivoted jaw having a hook arranged parallel with the end of the fixed jaw and adapted to grasp the tire.

The invention consists also in providing for the adjustment of the movable jaw and also the means for holding same in place.

The invention consists also in certain details of construction and novelties of combination, all of which will be fully described hereinafter and pointed out in the claims.

In the drawings forming part of my invention, Figure 1 is a view showing the practical application of my invention, the tool being shown in the act of lifting and placing the tire upon the rim of the wheel. Fig. 2 is a similar view showing the tool in the act of placing the tire in its final position. Fig. 3 is a detail view of the tool. Fig. 4 is a detail perspective view of the rigid jaw. Fig. 5 is a detail perspective view of the movable jaw.

In carrying out my invention I employ a fixed jaw A, which is preferably made of steel or wrought-iron and is pointed at its end, as shown at A'. The pointed end is flanged or flattened, as shown at $A^2$, which flanged or flattened portion terminates in a transverse shoulder or flange $A^3$, and directly beyond the transverse shoulder or flange the jaw is curved, as shown at $A^4$, providing a concavity or recess $A^5$ directly beyond said transverse flange or shoulder. The jaw is made integral with a shank or handle B, and said shank or handle is curved, as shown at B', where it joins the jaw, in order to bring the point of the jaw in direct line with the shank or handle and also provide for the recess or concavity $A^5$. The movable jaw C comprises a straight member C' and a hook portion $C^2$, said hook portion being preferably flanged, as shown at $C^3$, for the purpose of adding strength to the hook member. Member C' has a series of adjusting-notches produced therein, said notches being adapted to receive the pivot-stud D, made rigid upon the fixed jaw A, and a spring E, encircling a stud E', bears at one end upon the movable jaw and upon the shank or fixed jaw at the other end, thereby holding the movable jaw in position upon the stud of the fixed jaw.

In practice I prefer to slit or bifurcate the straight member C' of the movable jaw in order that it may straddle the fixed jaw, and it will of course be understood that both portions of the bifurcated member are notched exactly alike, and two pivot-studs—one on each side of the fixed jaw—will of course be movable; but it will be readily understood that it is not absolutely necessary to slit or bifurcate the movable jaw for the purpose of straddling the fixed jaw, inasmuch as the tool would be practically operative with the movable jaw arranged entirely upon one side of the fixed jaw.

The hook member has two or more notches or concavities $C^4$ and $C^5$ produced therein, said notches or concavities being adapted to receive one edge of the tire, while the other edge of the tire rests in the concavity or recess $A^5$ produced in the fixed jaw.

The shank or handle can be made any length desired, and likewise other parts of the tool.

The function of the spring is of course clearly understood, and likewise the manner of adjusting the movable jaw upon the fixed jaw.

In lifting and placing the hot tire upon the rim of the wheel the tire is grasped between one of the notches or concavities of the hook and the point of the jaw is caused to bear upon the rim of the wheel, and by lifting the shank or handle, as shown in Fig. 1, the tire will of course be lifted in such position that it can be readily placed upon the rim of the wheel, and by continuing the movement of the shank the tire will of course be brought directly above the rim, and then by moving the fixed jaw down, so that the transverse shoulder or flange will be brought to bear upon the rim, the tire can be finally set or placed in its proper and final position.

Entire manipulation of this tool can be accomplished with only one hand, leaving the other hand of the operator free, so that he may use the hammer or other tool whenever it becomes necessary. By means of this tool one is enabled to produce three distinctly-different movements or operations—namely, the lifting of the tire, the setting, and the placing or finishing off—as it will be distinctly understood that by means of this tool one is enabled to set the tire in its final position, so that it will not be necessary to hammer the tire into position after it becomes cold.

It will thus be seen that I provide an exceedingly cheap, simple, and efficient tool of the kind described which will successfully perform all the operations for which it was intended.

Having thus fully described my invention, what I claim as new, and desire to secure by Letters Patent of the United States, is—

1. In a tire setter and placer, consisting of a fixed jaw, having a transverse shoulder or flange adjacent its end and also formed with a concavity beyond said transverse shoulder or flange, and a movable jaw pivotally connected to the fixed jaw and adjustable thereon, said movable jaw having a hook at its end, the inner face of said hook having one or more concavities or recesses adapted to receive the tire, substantially as shown and described.

2. In a tire setter and placer, consisting of a fixed jaw, having a flanged end and a movable jaw having a hook end, said movable jaw being slitted longitudinally, and provided with a series of notches, the pivot-stud fixed upon the fixed jaw, and the spring for holding the fixed and movable jaws in position, substantially as shown and described.

3. In a tire setter and placer, comprising a fixed jaw, covered and flanged as described, the movable jaw having a hook end, said end having one or more recesses or concavities, said movable jaw being slitted longitudinally, and having a series of notches produced in said slitted portion, the pivot-stud carried by the fixed jaw and the spring fixed upon the fixed jaw and adapted to bear upon the movable jaw, substantially as shown and described.

4. In a tire setter and placer, the combination with the fixed jaw, having a shank or handle integral therewith, said fixed jaw being curved as described, flanged or flattened and pointed at its end, and having a transverse flange arranged upon said flattened and pointed portion, the movable jaw slitted longitudinally and having a hook at its end, said hook having one or more concavities or recesses produced therein, the slitted portion of the movable jaw having a series of notches produced therein, adapted for engagement with the pivot-stud, carried by the fixed jaw, and a spring arranged upon said fixed jaw for the purpose of holding the movable jaw in position, substantially as shown and described.

SAMUEL R. DUVALL.

Witnesses:
 CHAS. E. BROCK,
 CLARENCE SHAW.